United States Patent [19]

Morano

[11] Patent Number: 4,485,887
[45] Date of Patent: Dec. 4, 1984

[54] VEHICULAR ANTI-THEFT DEVICE

[76] Inventor: Michael W. Morano, 1471 Bay Ridge Pkwy., Brooklyn, N.Y. 11228

[21] Appl. No.: 547,125

[22] Filed: Oct. 31, 1983

[51] Int. Cl.³ ...................... B60R 25/00; B60R 25/04
[52] U.S. Cl. ............................... 180/287; 123/198 B; 307/10 AT; 340/63
[58] Field of Search .................... 180/287; 307/10 AT; 123/198 B; 340/63, 64

[56] References Cited
U.S. PATENT DOCUMENTS

| | | | |
|---|---|---|---|
| 3,700,063 | 10/1972 | Dunseath | 180/287 |
| 4,063,610 | 12/1977 | Shilling | 340/64 |
| 4,110,734 | 8/1978 | Lepore et al. | 180/287 |
| 4,175,635 | 11/1979 | Thomas | 180/287 |
| 4,300,495 | 11/1981 | Treviño et al. | 180/287 |
| 4,315,160 | 2/1982 | Levine | 180/287 |
| 4,320,382 | 3/1982 | Roucek | 180/287 |

Primary Examiner—Richard A. Bertsch

[57] ABSTRACT

There is provided in a motor vehicle a time delay operating circuit breaker interposed in the grounding path of the ignition coil with a normally open contact set of a relay in parallel with the circuit breaker. The relay can only be energized if, after the ignition key switch is closed, a concealed switch is momentarily closed. Otherwise, the circuit breaker will after a given time open and no current can flow through the coil so that the vehicle will stop if running.

2 Claims, 2 Drawing Figures

VEHICULAR ANTI-THEFT DEVICE

BACKGROUND OF THE INVENTION

This invention pertains to anti-theft devices and more particularly to ignition control devices for motor vehicles.

In the past several years the incidences of automobile thefts have increased to alarming proportions. With this increase there have been more and more anti-theft devices in the form of complex locks and alarms. As each device becomes known its utility decreases since means become known to defeat the device. While it is true that one may never devise the absolute anti-theft device because of high cost there is a need for inexpensive devices which will deter all but the most persistent thief.

SUMMARY OF THE INVENTION

It is a general object of the invention to provide an improved vehicular anti-theft device which is inexpensive and simple to install in a motor vehicle.

Briefly, the invention contemplates an anti-theft device centering around a relay having an energizing coil and first and second normally open contact sets. The ignition key switch of the vehicle and the energizing coil of the relay are connected in series across the terminals of the vehicle with a concealed normally-open second switch connected in parallel with the one contact set so that after the ignition key switch is closed the relay is energized and held energized only after the second switch is momentarily closed.

A normally closed circuit breaker having a time delay is interposed between one end of the ignition coil and the grounded terminal of the battery to control the current return path. Connected in parallel with the circuit breaker is the other contact set of the relay so that when the relay is energized the circuit breaker is shorted out of the return current path and the ignition coil can operate. Otherwise, after a given period of time the breaker operates and opens the current return path.

BRIEF DESCRIPTION OF THE DRAWING

Other objects, the features and advantages of the invention will be apparent from the following detailed description when read with the accompanying drawing which shows by way of example and not limitation the presently preferred embodiment of the invention.

In the drawing

DESCRIPTION OF THE PREFERRED EMBODIMENT

Figure 1:
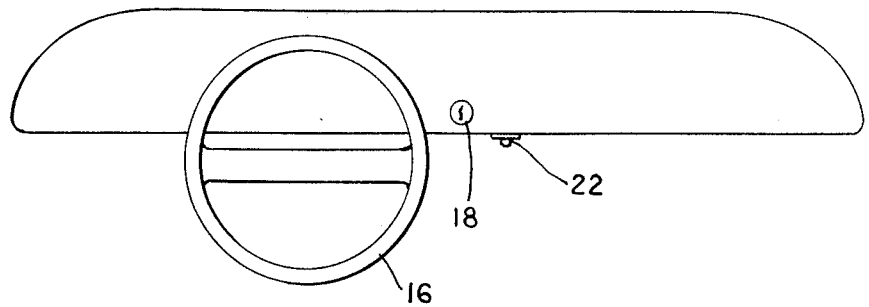
FIGS. 1 shows the dashboard of a motor vehicle.
Figure 2:
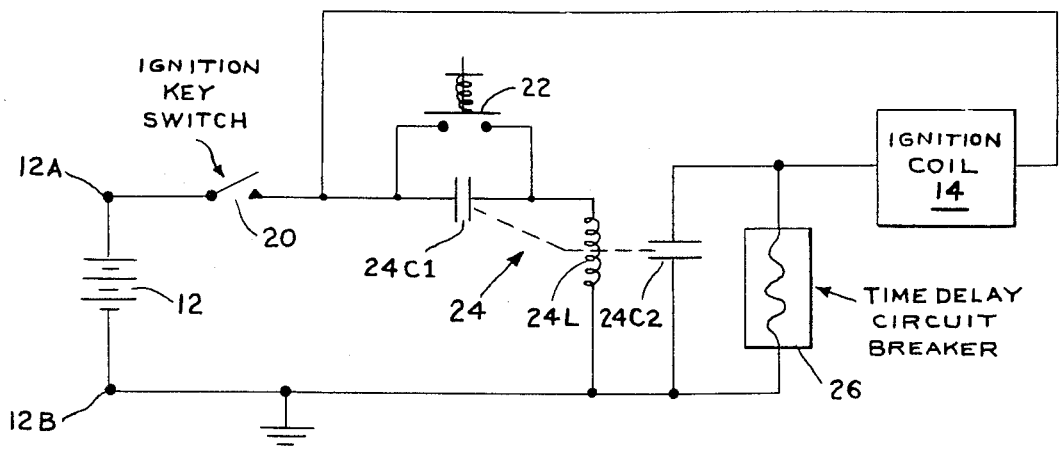
FIG. 2 is a schematic diagram of the anti-theft device in accordance with the invention.

Behind the dashboard 10 and/or under the hood of the motor vehicle is the battery 12, and the ignition coil 14 which are part of the conventional ignition system for the vehicle while either on the dashboard 10 or on the column of the steering wheel 16 is the ignition lock 18 and its associated ignition key switch 20. On the base of the dashboard out of view is a hidden push-button switch 22.

The battery has a positive terminal 12A and a grounded negative terminal 12B. The positive terminal 12A of the battery is connected to one terminal of the ignition key switch 20 whose other terminal is connected to one end of the ignition coil 14.

The other end of the ignition coil 14 is connected via time-delay circuit breaker 26 to the grounded terminal 12B of the battery.

The main control for the device resides in the relay 24 having an energizing coil 24L and the two normally-open contact sets 24c1 and 24c2 which close when the coil is energized. The normally-open contact 24c1 and the coil 24L are connected in series between the other terminal of the ignition key switch 20 and the grounded terminal 12B of the battery. The switch 22 which is a push-button switch spring-biased to the open position, is connected in parallel with the normally-open contact set 24c1 of the relay 24. The other normally-open contact 24c2 of the relay 24 is connected in parallel with the time-delay circuit breaker 26.

In normal operation the motor vehicle operator inserts and turns the ignition key which closes the switch 20. Then he reaches under the dashboard 10 and momentarily depresses the push-button switch 22.

During the instant of closure of the switch 22 current flows from terminal 12A of the battery 12 via the now-closed switches 20 and 22 and the coil 24L of relay 24 to the terminal 12B. This flow of current through coil 24L energizes the relay 24 causing the normally-open contact sets 24c1 and 24c2 to close. Thus when the operator releases the push-button switch 22 the relay still remains energized because current now flows from terminal 12A via the switch 20, the now closed contact set 24c1 and the coil 24L to the terminal 12B of the battery 12. (The relay 24 will remain energized until the switch 20 is opened by rotating the ignition key to the off position). At the same time contact set 24c2 closed and a current path was established from the ignition coil 14 to the grounded terminal 12B. Thus, the ignition coil can be energized in the usual manner.

On the other hand, if the push-button switch had not been momentarily depressed by an unauthorized user, the relay 24 would not have been energized and the contact set 24c2 would have remained open. Then, the current path for the ignition coil 14 would be through time delay circuit breaker 26.

After a period of time this circuit breaker 26 would open and latch in the open position so that no current would flow through the ignition coil 14. If the time delay is chosen in the order of a few seconds the unauthorized user would conclude there is an ignition problem and would most likely leave the vehicle.

While only one embodiment of the invention has been shown and described in detail there will now be obvious to those skilled in the art many modifications and variations satisfying many or all of the objects of the invention without departing from the spirit thereof as defined by the appended claims.

I claim:

1. In a motor vehicle having a battery with a pair of terminals, one of said terminals being grounded and the other being a source of operating current, an ignition system having an ignition coil with one end connected to the other terminal of said battery and another end, and a normally open ignition key switch having one terminal connected to the other terminal of the battery and a second terminal, an anti-theft device comprising a relay, said relay having an energizing coil and first normally open and second normally open contact sets, means for connecting one of said contact sets and said energizing coil in series between the other terminal of the ignition key switch and the grounded terminal of said battery, a normally-open push button spring-biased second switch having pair of normally open contacts, said second switch being concealed in the motor vehicle, means for connecting said second switch in parallel with the first contact set of said relay in order to temporarily energize said relay and to close said first and second contact sets, means for connecting the second contact set of said relay between the other end of the ignition coil and the grounded terminal of said battery.

2. The device of claim 1 further comprising a normally-closed circuit breaker means which will open when current flows therethrough for a given period of time, and means for connecting said circuit breaker means between the other end of the ignition coil and the grounded terminal of said battery.

* * * * *